United States Patent [19]

Kobayashi et al.

[11] Patent Number: 5,164,477
[45] Date of Patent: Nov. 17, 1992

[54] POLYFUNCTIONAL POLYMERIZATION INITIATOR

[75] Inventors: Shiro Kobayashi, 1-1-302, Kawauchi Juutaku, Kawauchi Mubanchi, Sendai-shi, Miyagi 980; Hiroshi Uyama, Tagajo, both of Japan

[73] Assignee: Shiro Kobayashi, Sendai, Japan

[21] Appl. No.: 739,539

[22] Filed: Aug. 2, 1991

Related U.S. Application Data

[62] Division of Ser. No. 489,155, Mar. 6, 1990, abandoned.

[51] Int. Cl.$^5$ .............................................. C08G 78/00
[52] U.S. Cl. .................................. 528/408; 528/424; 528/398; 528/378
[58] Field of Search ................ 528/408, 424, 398, 378

[56] References Cited

U.S. PATENT DOCUMENTS 4,204,064  5/1980  Kalopissis et al. .
4,265,836  5/1981  Weigers et al. .
4,306,100  12/1981  Wood .

OTHER PUBLICATIONS

S. Kobayashi et al. (1986) Macromol. 19, 535–541.
S. Kobayashi et al. (1987) Macromal. 20, 1729–1734.
R. T. Morrison and R. N. Boyd, "Organic Chemistry", 3rd Ed. Allyn & Bacon, Boston, 1973, p. 21.
CRC Handbook of Chemistry and Physics, 54th ed., p. C-224.
Chemical Abstracts, vol. 30, 4809.

*Primary Examiner*—Bernard Lipman
*Assistant Examiner*—M. Nagumo
*Attorney, Agent, or Firm*—Armstrong & Kubovcik

[57] ABSTRACT

A polyfunctional polymerization initiator suitable to cationic ring-opening polymerization of heterocyclic monomers, having at least one carbon atom bonded directly to a carbon-carbon double bond in a linear or cyclic organic group and, further, having at least two following groups containing the above said carbon atoms and represented by the general formula:

$$-CH_2X$$

where X represents an electron attracting group such as I, Br, Cl, F, $-OSO_2R$, $-SOR$, $-OCOR$, $-OPO(OR)_2$ and $-OP(OR)R$ and R is optionally selected from (substituted) alkyl groups or (substituted) aryl groups.

Various types of telechelic polymer, block copolymer, comb-like polymer and star-like polymer having controlled molecular weight and narrow molecular weight distribution can be produced efficiently from the heterocyclic monomer as the starting material.

9 Claims, No Drawings

POLYFUNCTIONAL POLYMERIZATION INITIATOR

This is a division, of application Ser. No. 07/489,155 filed Mar. 6, 1990, now abandoned.

BACKGROUND OF THE INVENTION

1. Field of the Invention

The present invention concerns a novel polyfunctional polymerization initiator and, more in particular, it relates to a polyfunctional polymerization initiator suitable to cationic ring-opening polymerization of heterocyclic monomers. The polymerization initiator according to the present invention can be utilized for obtaining telechelic polymer, block copolymer, comb-like or star-like polymer, etc. and it is, further, useful for the synthesis of crosslinker, coupling agent, IPN (interpenetrating network composite material), etc.

2. Description of the Prior Art

For cationic ring-polymerization of heterocyclic monomers, metal halides, alkyl halides such as methyl iodide and sulfonic acid esters such as methyl p-toluene sulfonate, etc., have been used. However, it is not possible with such monofunctional polymerization initiator to obtain telechelic polymer, block polymer such as A-B-A type polymer, comb-like or star-like polymer, etc. On the other hand, while it may be considered that telechelic polymer, block polymer comb-like or star-like polymer may be obtained by using a polyfunctional polymerization initiator such as alkyl dihalide or sulfonic acid diester, etc., the initiation is not fast and hence, polymers of controlled molecular weight can not be obtained by merely using a poly-substituted aliphatic compounds.

Further, as a technique for obtaining the telechelic polymer, block polymer, etc. as described above by the cationic ring-opening polymerization of heterocyclic monomers, there has been known a method of using a compound obtained by reacting a bisoxazoline and an ester as shown in the formula (1) as the polyfunctional polymerization initiator (Macromol., 19, 535 (1986)).

However, this method involves a problem that the polyfunctional polymerization initiator is difficult to be synthesized and the operations therefore are troublesome, as well as separation or purification of the products is difficult.

As another method, there has been known a method of using a poly-substituted aliphatic ester as shown in the formula (2) (Macromol., 20, 1729 (1987)).

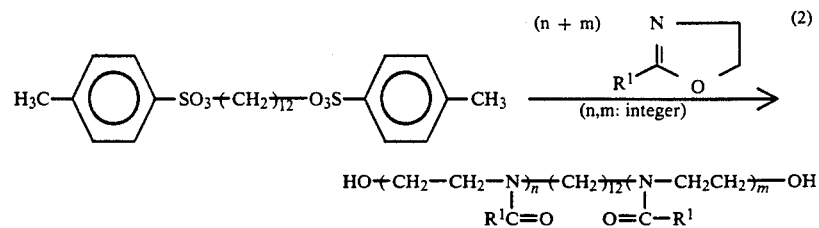

In this method, however, since the rate of initiation reaction is lower than that of the propagation reaction, the initiator is present with on one or both of initiation groups remaining unreacted after the monomers have been consumed completely and, further, the molecular weight control of the polymer is difficult and the molecular weight distribution of the resultant polymer is broad.

OBJECT OF THE INVENTION

It is, accordingly, an object of the present invention to overcome the foregoing problems and provide a method capable of easily synthesizing telechelic polymer, block copolymer, comb-like polymer, star-like polymer, etc. of controlled molecular weight.

SUMMARY OF THE INVENTION

With a view that a search for the polymerization initiator is most important in order to attain the foregoing purpose, the present inventors have made an earnest study considering that the initiation reaction is slow because the electrophilic reactivity of carbon atoms as the initiating group of the polymerization is not sufficiently high. As a result, we have found that when a linear or cyclic organic compound in which all carbon atoms forming the initiating group of polymerization have substituents such as halogen atom, sulfoxyl group and phosphoxyl group that form stable pair anion in the polymerization and such carbon atoms are present at the adjacent position of the carbon-carbon double bonds for stabilizing the resultant cations, is used as an initiator, the electrophilic reactivity of the carbon atoms of the initiator is increased to render the initiation reaction rate higher due to the activation by the carbon-carbon double bonds and a desired polymer of controlled molecular weight can be obtained. The present invention has been accomplished based on such findings.

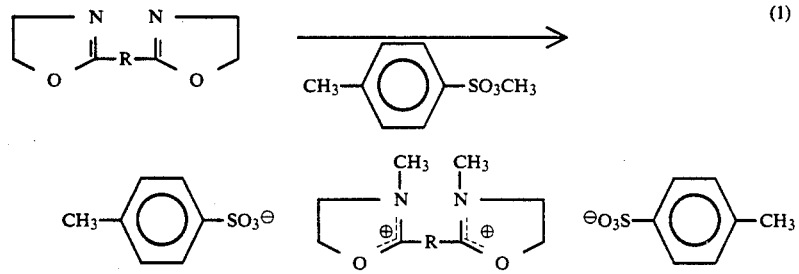

That is, the polyfunctional polymerization initiator according to the present invention capable of attaining the foregoing object has at least one carbon atom bonded directly to a carbon-carbon double bond in a linear or cyclic organic group and, further, having at least two following groups containing the above said carbon atoms and represented by the general formula:

—CH$_2$X where X represents an electron attracting group such as I, Br, Cl, F, —OSO$_2$R, —SOR, —OCOR, —OPO(OR)$_2$ or —OP(OR)R and R is optionally selected from (substituted alkyl groups or (substituted) aryl groups. The polyfunctional polymerization initiator is characterized by containing at least two such —CH$_2$X groups.

With the polyfunctional polymerization initiator according to the present invention, it is possible to efficiently produce various kinds of telechelic polymer, block copolymers, comb-like polymer, star-like polymers, etc. having well-controlled molecular weight and molecular weight distribution from heterocyclic monomers as the starting material and an economical production of novel functional materials is enabled.

The polyfunctional polymerization initiator according to the present invention as described above has a linear or cyclic organic group as a basic skelton and, in particular, has at least one of either one or both of linear or cyclic olefinic organic groups or aromatic rings. Typical structures of the polyfunctional polymerization initiator according to the present invention as described above can include, the followings:

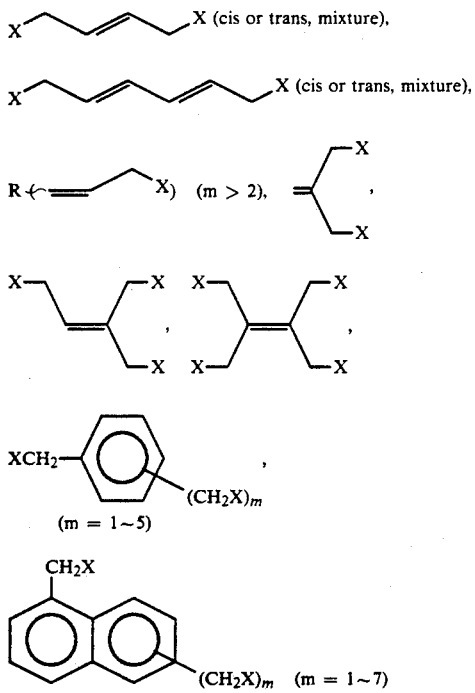

The substituent X represents an electron attracting group such as I, Br, Cl, F, —OSO$_2$R, —SOR, —OCOR, —OPO(OR)$_2$, or —OP(OR)R and R is optionally selected from (substituted) alkyl group or (substituted) aryl group. Further, other various structures such as those in which similar structures are introduced to the side chain on the polymer, for example, chloromethyl styrene polymer may be used.

As specific examples of the polyfunctional polymerization initiator, there can be mentioned, for example, 1,4-dibromo-2-butene, 3-bromo-2-bromomethyl-1-propene, 1,4-dibromo-2-bromomethyl-2-butene, 1,4-dibromo-2,3-bisbromomethyl-2-butene, bisbromomethylbenzene, trisbromomethylbenzene, bisbromomethylnaphthalene and trisbromomethylnaphthalene.

As the heterocyclic monomer to be polymerized by the polyfunctional polymerization initiator according to the present invention, there can be mentioned, for example, 2-oxazolines, 1,3-oxazines, azetizines, aziridines, phospholanes, phosphorinanes, deoxophostones, ethylene sulfide and thiethane.

There is no particular restriction for the polymerization conditions using the polyfunctional polymerization initiator according to the present invention and similar conditions to those for the monofunctional polymerization initiator may be employed. Further, for easily inducing the initiating reaction, the polyfunctional polymerization initiator according to the present invention may be used in combination with an inorganic salt such as sodium iodide. As a solvent used herein, those causing no hindrance to the polymerizing reaction such as acetonitrile, benzonitrile, nitromethane, toluene or benzene may be used properly alone or as a mixture. There is also no particular restriction for the polymerizing reaction and the polymerization is usually conducted at a temperature from −20° C. to 150° C., preferably, from 0° C. to 120° C. Further, molecular weight of the resultant polymer can be controlled by changing the molar ratio of the monomer used to the initiator. Further, for the introduction of the functional groups to the terminal end of polymer, a method described in, for example, Japanese Patent Publication Sho 63-96692 may be used.

DETAILED DESCRIPTION OF THE PREFERRED EMBODIMENTS

The present invention is to be described more specifically referring to examples.

EXAMPLE 1

Under a dry nitrogen atmosphere, 5 ml of acetonitrile, 0.76 g (8.9 mmol) of 2-methyl-2-oxazoline and 0.21 g (1.0 mmol) of 1,4-dibromo-2-butene were charged into a vessel of 30 ml volume made of glass and heated at 70° C. for 7 hours. After cooling it to a room temperature, 0.54 g of water and 1.7 g of potassium carbonate were added and refluxed for 24 hours. Then, after removing the solvent by evaporation, the residue was extracted with chloroform and the extract was concentrated and reprecipitated from 150 ml of diethyl ether, to obtain 0.80 g (95% yield) of a white powdery polymer.

The number average molecular weight of the compound was measured by GPC and VPO as 771 and 840, respectively. Further, the molecular weight distribution measured by GPC was 1.24. The number average molecular weight calculated from the molar ratio of the monomer to the polymerization initiator was 814 and it can be seen that the molecular weight is well-controlled and the molecular weight distribution is narrow.

Further, it has been confirmed that polymer chains were formed respectively on both sides of the 1,4-bromo-2-butene initiator in view of the ratio of the signal at 5.5–5.6 ppm due to the polymerization initiator to the signal at 2.3 ppm due to the methyl group of oxazolinium ion at the propagating terminal end by NMR spectroscopy of the polymerization system.

Chemical shift of the protons in $^1$H-NMR(CDCl$_3$, $\delta$ value) was as shown below.

2.1 (s. CH$_3$C=O), 2.9-3.9 (br., CH$_2$N), 5.4-5.6 (m, (CH=CH)

IR(KBr)

3400 cm$^{-1}$ ($\nu$ O—H), 1630 cm$^{-1}$ ($\nu$ C=O)

COMPARATIVE EXAMPLE 1

Reaction was conducted in the same manner as in Example 1 except for using 0.82 g (0.6 mmol) of 2-methyloxazoline and 0.22 g (1.0 mmol) of 1,4dibromobutene, to obtain 0.71 g (87% yield) of a white powdery polymer.

The number average molecular weight of the resultant compound was 2270 and the molecular weight distribution was 1.60 as measured by GPC. Since the average molecular weight calculated from the molar ratio of the monomer to the initiator was 874, it has been found that the molecular weight is not well controlled and the molecular weight distribution is broad since the initiation reaction is slow.

EXAMPLE 2

Under a dry argon atmosphere, 6 ml of acetonitrile, 1.98 g (20.0 mmol) of 2-ethyl-2-oxazoline and 0.40 g (1.0 mmol) of 2-tosyloxymethyl-3-tosyloxy-1-propene were charged into a vessel of 30 ml volume made of glass and heated at 80° C. for 24 hours. After cooling them to a room temperature, 0.50 g of water and 1.5 g of sodium carbonate were added and further heated at 80° C. for 24 hours. Then, after removing the solvent by evaporation, the residue was extracted with chloroform, and the extract was concentrated and then dissolved into an acetonitrile solution and reprecipitated from 150 ml of diethyl ether, to obtain 2.01 g (97% yield) of a white powdery polymer.

When the number average molecular weight of the compound was measured by VPO, it was 2210 and the polymerization degree was calculated to be 21.4. Further, the molecular weight distribution was 1.20 as measured by GPC. The polymerization degree calculated from the molar ratio of the monomer to the polymerization initiator was 20 and it can be seen that the molecular weight is well controlled and the molecular weight distribution is narrow.

EXAMPLES 3-9

In the same procedures as those in Example 1, 2-methyl-2-oxazoline (MeOZO) was polymerized at 70° C. using acetonitrile as a solvent and 1.0 mmol of the polymerization initiator. The polymerization conditions and the results are shown in Table 1.

TABLE 1

| Example No. | Polymerization initiator | (MeOZO) (Polymerization initiator) | Yield (%) | Number average molecular weight | Polymerization degree | Molecular weight distribution |
| --- | --- | --- | --- | --- | --- | --- |
| 3 | ClCH$_2$CH=CHCH$_2$Cl/NaI* | 10.1 | 85 | 1050 | 11.2 | 1.11 |
| 4 | H$_2$C=C(CH$_2$I)$_2$ | 9.4 | 94 | 850 | 8.9 | 1.16 |
| 5 | H$_2$C=C(CH$_2$Cl)$_2$/NaI* | 10.0 | 82 | — | — | 1.24 |
| 6 | BrCH$_2$—⟨C$_6$H$_4$⟩—CH$_2$Br | 9.7 | 96 | 1010 | 10.2 | 1.22 |
| 7 | ICH$_2$—⟨C$_6$H$_4$⟩—CH$_2$I | 10.0 | 82 | 910 | 9.0 | 1.19 |
| 8 | ClCH$_2$—⟨C$_6$H$_4$⟩—CH$_2$Cl/NaI* | 10.2 | 88 | — | — | 1.24 |
| 9 | ClCH$_2$—⟨C$_6$H$_4$⟩—CH$_2$Cl/NaI* | 9.8 | 71 | 790 | 8.8 | 1.24 |

*NaI/Cl = 1.1/1.0

EXAMPLE 10

Under a dry argon atmosphere, 6 ml of acetonitrile, 0.85 g (10.0 mmol) of 2-methyl-2-oxazoline and 0.1 g (1.0 mmol) of 1,4-dibromo-2-butene were charged into a vessel of 30 ml volume made of glass and heated at 80° C. for 24 hours. After cooling them to a room temperature, 1.27 g (10 mmol) of 2-n-butyl-2-oxazoline were added and heated at 80° C. for 8 hours. After cooling them to a room temperature, 0.50 g of water and 1.5 g of sodium carbonate were added and further heated at 80° C. for 24 hours. Then, after removing the solvent by evaporation, the residue was extracted with chloroform and the extract was concentrated and then dissolved into an acetonitrile solution and reprecipitated from 150 ml of diethyl ether, to obtain 2.17 g (99% yield) of a white powdery polymer.

When the number average molecular weight of the compound was measured by VPO, it was 2370 and the polymerization degree was calculated to be 21.8. The molecular weight distribution was 1.26 as measured by GPC. The ratio of units of 2-methyl-2-oxazoline to 2-n-butyl-2-oxazoline in the polymer determined from ¹H-NMR was 1.1. The polymerization degree calculated from the molar ratio of the monomer to the initiator was 20.0 and it can be seen that the block polymer has a well-controlled molecular weight and a narrow molecular weight distribution.

What is claimed is:

1. A process for cationic ring-opening polymerization of 2-oxazolines, comprising contacting a 2-oxazoline with a polyfunctional polymerization initiator having at least one carbon atom bonded directly to a carbon-carbon double bond in a linear or cyclic organic group, said carbon-carbon double bond having at least two groups represented by the formula —CH$_2$X, wherein X represents an electrophilic group, and polymerizing said 2-oxazoline at a temperature of from −20° to 150° C.

2. The process of claim 1, wherein said linear or cyclic organic group is selected from at least one of the group consisting of linear olefinic groups, cyclic olefinic groups and aryl groups.

3. The process of claim 1, wherein said electrophilic group is selected from the group consisting of I, Br, Cl, —OSO$_2$R, —SOR, —OCOR, —OPO(OR)$_2$ and —OP(OR)R, and wherein R is selected from alkyl groups and aryl groups.

4. The process of claim 1, wherein said polyfunctional polymerization initiator is selected from the group consisting of 1,4-dibromo-2-butene, 3-bromo-2-bromomethyl-1-propene, 1,4-dibromo-2-bromomethyl-2-butene, 1,4-dibromo-2,3-bis(bromomethyl)-2-butene, bis(bromomethyl)benzene, tris(bromomethyl)benzene, bis(bromomethyl)napthalene, tris(bromomethyl)napthalene and 2-tosylmethyl-3-tosyloxy-1-propene.

5. The process of claim 4, wherein said polyfunctional polymerization initiator is 1,4-dibromo-2-butene.

6. The process of claim 1, wherein an inorganic salt is added to said polyfunctional polymerization initiator.

7. The process of claim 6, wherein said inorganic salt comprises sodium iodide.

8. A polymer produced by the process of claim 1.

9. The polymer of claim 8, wherein said polyfunctional polymerization initiator is 1,4-dibromo-2-butene.

* * * * *